(12) United States Patent
Ye et al.

(10) Patent No.: US 10,116,780 B2
(45) Date of Patent: Oct. 30, 2018

(54) QUICK COMMUNICATION METHOD AND DEVICE, AND STORAGE MEDIUM

(71) Applicant: TENCENT TECHNOLOGY (SHENZHEN) COMPANY LIMITED, Shenzhen, Guangdong (CN)

(72) Inventors: Liwei Ye, Shenzhen (CN); Yu Lei, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 457 days.

(21) Appl. No.: 14/469,297

(22) Filed: Aug. 26, 2014

(65) Prior Publication Data

US 2014/0364107 A1    Dec. 11, 2014

Related U.S. Application Data

(63) Continuation of application No. PCT/CN2013/089269, filed on Dec. 12, 2013.

(30) Foreign Application Priority Data

May 27, 2013    (CN) .......................... 2013 1 0201767

(51) Int. Cl.
*H04M 1/67*    (2006.01)
*H04M 1/725*    (2006.01)

(52) U.S. Cl.
CPC ............ *H04M 1/67* (2013.01); *H04M 1/7258* (2013.01); *H04M 1/72586* (2013.01)

(58) Field of Classification Search
CPC .. H04M 1/67; H04M 1/7258; H04M 1/72586; H04M 1/274583
See application file for complete search history.

(56) References Cited

U.S. PATENT DOCUMENTS 6,760,431 B1 * 7/2004 Haimi-Cohen ............................ H04M 1/274583
379/355.01
7,231,229 B1 * 6/2007 Hawkins ......... H04M 1/274558
345/1.1

(Continued)

FOREIGN PATENT DOCUMENTS

CN    101287027    10/2008
CN    101867646    10/2010

(Continued)

OTHER PUBLICATIONS

International Search Report dated Feb. 27, 2014 in International Application No. PCT/CN2013/089269, filed Dec. 12, 2013.

(Continued)

*Primary Examiner* — Ajay M Bhatia
*Assistant Examiner* — Phoebe X Pan
(74) *Attorney, Agent, or Firm* — Anova Law Group, PLLC

(57) ABSTRACT

A quick communication method and device, and a storage medium are disclosed in the in present disclosure which belongs to the field of mobile communication. The method includes: displaying a quick communication key on the lock screen interface of a terminal; invoking a shortcut panel according to an operation triggered by a user on the quick communication key, and the shortcut panel includes contact information of a part or all of the contact objects from the contact list in the terminal; receiving a contact object selected by the user, and communicating with the contact object; and the device includes: a display module, an invoking module, and a communicating module. Quick communication with a contact object can be implemented by the present invention through the quick communication key on (Continued)

the lock screen interface of the terminal to improve the efficiency of terminal communication.

20 Claims, 6 Drawing Sheets

(56) References Cited

U.S. PATENT DOCUMENTS

| | | | | |
|---|---|---|---|---|
| 7,852,991 | B1* | 12/2010 | Croak | H04M 3/42153 379/100.14 |
| 8,136,053 | B1* | 3/2012 | Miller | G06F 3/04883 345/156 |
| 8,209,390 | B1* | 6/2012 | Gibbs | H04L 51/28 709/206 |
| 8,244,672 | B1* | 8/2012 | Thenthiruperai | H04W 4/001 707/621 |
| 8,392,836 | B1* | 3/2013 | Bau | G06Q 10/107 715/739 |
| 8,504,842 | B1* | 8/2013 | Meacham | G06F 3/0488 713/182 |
| 8,547,466 | B2* | 10/2013 | Chao | G06F 3/04883 348/333.01 |
| 8,793,606 | B2* | 7/2014 | Kim | G06F 3/04817 345/173 |
| 8,805,417 | B2* | 8/2014 | Angiolillo | H04M 1/274583 455/456.3 |
| 8,954,895 | B1* | 2/2015 | Yaksick | G06F 3/04883 715/863 |
| 8,989,357 | B2* | 3/2015 | Renero Quintero | H04M 3/42144 379/207.15 |
| 9,009,630 | B2* | 4/2015 | Kruzeniski | G06F 21/6209 715/817 |
| 9,137,666 | B1* | 9/2015 | Bonn | H04W 12/08 |
| 9,213,822 | B2* | 12/2015 | Dellinger | G06F 21/36 |
| 9,230,076 | B2* | 1/2016 | King | G06F 21/53 |
| 9,710,134 | B1* | 7/2017 | Russell | G06F 3/0482 |
| 2002/0151334 | A1* | 10/2002 | Sharma | H04M 1/274583 455/566 |
| 2005/0246325 | A1* | 11/2005 | Pettinati | G06F 3/0237 |
| 2007/0032267 | A1* | 2/2007 | Haitani | H04L 12/5835 455/556.2 |
| 2008/0033946 | A1* | 2/2008 | Bhogal | H04M 1/274583 |
| 2008/0147639 | A1* | 6/2008 | Hartman | G06F 17/3053 |
| 2008/0295017 | A1* | 11/2008 | Tseng | G06F 3/0483 715/777 |
| 2009/0063967 | A1* | 3/2009 | Lee | G06F 3/038 715/702 |
| 2009/0234874 | A1* | 9/2009 | Sylvain | G06Q 10/107 |
| 2009/0244023 | A1* | 10/2009 | Kim | G06F 3/0416 345/173 |
| 2009/0274286 | A1* | 11/2009 | O'Shaughnessy | H04M 1/72547 379/201.12 |
| 2010/0001967 | A1* | 1/2010 | Yoo | G06F 3/0488 345/173 |
| 2010/0269040 | A1* | 10/2010 | Lee | G06F 3/04817 715/702 |
| 2011/0105193 | A1* | 5/2011 | Lee | G06F 3/0488 455/566 |
| 2011/0294467 | A1* | 12/2011 | Kim | G06F 1/1643 455/411 |
| 2012/0046077 | A1* | 2/2012 | Kim | H04M 1/72577 455/566 |
| 2012/0060123 | A1* | 3/2012 | Smith | G06F 3/04883 715/833 |
| 2013/0053105 | A1* | 2/2013 | Lee | H04M 1/673 455/565 |
| 2013/0082965 | A1* | 4/2013 | Wada | G06F 3/04883 345/173 |
| 2013/0225118 | A1* | 8/2013 | Jang | H04W 4/90 455/404.2 |
| 2013/0298024 | A1* | 11/2013 | Rhee | G06F 21/31 715/716 |
| 2013/0324089 | A1* | 12/2013 | Kim | G06F 21/32 455/411 |
| 2014/0181964 | A1* | 6/2014 | Park | G06F 21/6209 726/19 |
| 2014/0280244 | A1* | 9/2014 | Schwartz | H04L 51/28 707/752 |
| 2014/0298187 | A1* | 10/2014 | Shen | G06F 3/0482 715/739 |
| 2014/0298268 | A1* | 10/2014 | Kang | G06F 3/04847 715/841 |

FOREIGN PATENT DOCUMENTS

| | | |
|---|---|---|
| CN | 102231097 A | 11/2011 |
| CN | 102664983 | 9/2012 |
| CN | 102883022 | 1/2013 |
| CN | 103227859 | 7/2013 |
| CN | 103297610 | 9/2013 |

OTHER PUBLICATIONS

The State Intellectual Property Office of the People's Republic of China Office Action 1 for 201310201767.6 dated Nov. 2, 2015 7 Pages (including translation).

* cited by examiner

QUICK COMMUNICATION METHOD AND DEVICE, AND STORAGE MEDIUM

CROSS-REFERENCE TO RELATED APPLICATION

This application is a continuation application of PCT Patent Application No. PCT/CN2013/089269, filed on Dec. 12, 2013, which claims priority to Chinese Patent Application No. 201310201767.6, filed on May 27, 2013, both of which are incorporated by reference in their entireties.

FIELD

The present disclosure relates to the field of mobile communication, and in particular to a quick communication method and device, and a storage medium.

BACKGROUND

Mobile phones have become indispensable in the work and life of people so far along with the development of the mobile communication technologies, and are used by users for communicating with contact objects, for example, by calling the contact object or sending a short message to the contact object.

Currently, to contact with a certain contact object, the user needs to unlock the keypad of the mobile phone, open a contact interface or a call history interface to look up the contact object therein, and then select the contact object found in the opened contact interface or the call history interface, so that the mobile phone obtains contact information of the contact object from the contact interface or the call history interface, and communicate with the contact object according to the contact information of the contact object.

In implementing the present technology, at least the following problems in the prior art are found by the inventor.

Redundant steps are taken by the user to select and provide the contact object to the mobile phone when the user needs to communicate with the contact object, which leads to a low efficiency of initiating the communication between the user and the contact object.

SUMMARY

A quick communication method and device, and a storage medium have been provided by the present disclosure to solve the problems in the art. The solutions are as follows.

In one aspect, a quick communication method is provide, and the method includes: displaying a quick communication key on a lock screen interface of a terminal; invoking a shortcut panel at the terminal according to an operation triggered by a user on the quick communication key, where the shortcut panel includes contact information of a part or all of contact objects from the contact list in the terminal; and receiving a contact object selected by the user, and communicating with the contact object.

In another aspect, a quick communication device is provided, and the device includes: a display module, which is configured to display a quick communication key on a lock screen interface of a terminal; an invoking module, which is configured to invoke a shortcut panel at the terminal according to an operation triggered by a user on the quick communication key, where the shortcut panel includes contact information of a part or all of the contact objects from a contact list in the terminal; and a communicating module, which is configured to receive a contact object selected by the user, and communicate with the contact object.

In still another aspect, a storage medium comprising computer-executable instructions is provided, where the computer-executable instructions are configured to perform a quick communication method, and the method comprises: displaying a quick communication key on a lock screen interface of a terminal; invoking a shortcut panel at the terminal according to an operation triggered by a user on the quick communication key, where the shortcut panel includes contact information of a part or all of the contact objects from a contact list in the terminal; and receiving a contact object selected by the user, and communicating with the contact object.

In the embodiments of the present disclosure, a quick communication key is displayed on the lock screen interface at the terminal, and an operation is triggered by the user on the quick communication key to invoke a shortcut panel at the terminal, to enable the user to select a contact object from the shortcut panel and communicate with the selected contact object. Accordingly, just one operation of clicking the quick communication key is necessary for selecting the contact object, thus the efficiency of the communication between the terminals is improved.

BRIEF DESCRIPTION OF THE DRAWINGS

The accompanying figures used for the description of the embodiment will be simply described below for clear illustration of the technical solutions of the present disclosure. Apparently, the figures used for the description below illustrate only a part of the embodiments of the present disclosure, and it is possible for the skilled in the art to obtain other figures according to the figures below without creative work.

DETAILED DESCRIPTION

The technical solutions of the present disclosure will be further described below through embodiments in combination with accompanying drawings.

First Embodiment

Figure 1:
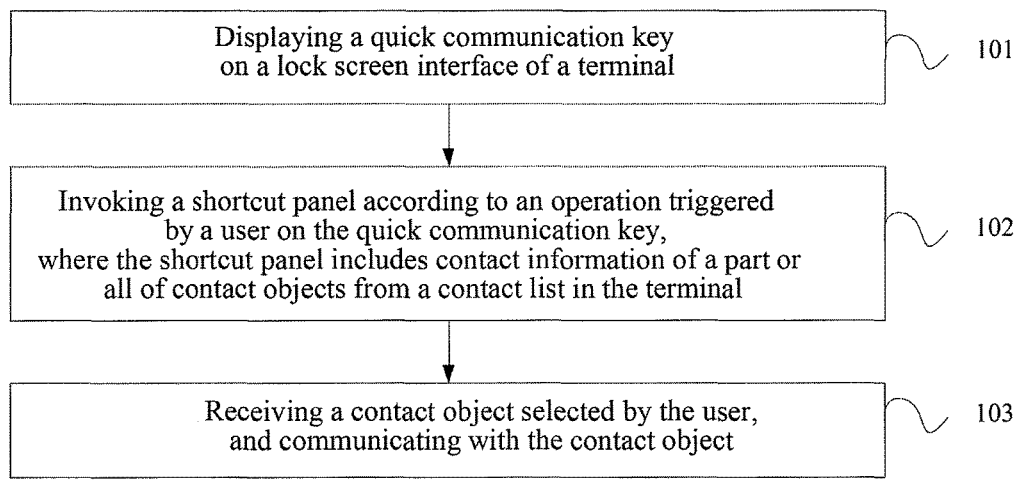
FIG. 1 is a flow chart of the quick communication method according to a first embodiment of the present disclosure.

A quick communication method is provided by the present embodiment of the disclosure. As illustrated in the FIG. 1, the method includes: step 101: displaying a quick communication key a the lock screen interface of a terminal; step 102: invoking a shortcut panel at the terminal according to an operation triggered by a user on the quick communication key, where the shortcut panel includes contact information of a part or all of the contact objects from a contact list in the terminal; and step 103: receiving a contact object selected by the user, and communicating with the contact object.

Preferably, the step of invoking a shortcut panel includes: selecting contact objects each with a contact frequency larger than a first preset threshold or a first preset number of contact objects with the top contact frequencies from the contact list in the terminal, according to the contact frequencies of the contact objects in the contact list of the terminal, where the contact frequency of the contact object refers to the frequency of communication between the user and the contact object; and loading the contact information of the contact object selected from the contact list to the shortcut panel in the terminal.

Preferably, the contact list also includes portraits of the selected contact objects.

The step of loading the contact information of the contact object selected from the contact list to the shortcut panel in the terminal includes: obtaining the portrait of the selected contact object from the contact list in the terminal; binding the portrait of the selected contact object with the contact information; and loading the bound portrait of the contact object selected from the contact list to the shortcut panel.

Preferably, a shortcut list is also included in the terminal, and is used to store identifiers and contact information corresponding to the portraits of the contact objects, and the contact objects in the shortcut list are composed by a part or all of the contact objects in the contact list.

The step of invoking a shortcut panel includes: loading the shortcut list in the terminal to the shortcut panel; obtaining an identifier and contact information of the contact object from the shortcut panel of the terminal; obtaining, from the contact list in the terminal, a portrait of the contact object corresponding to the identifier, according to the identifier corresponding to the portrait of the contact object; and binding the portrait of the contact object with the contact information of the contact object, and loading the portrait of the contact object to the shortcut panel.

Preferably, the step of receiving a contact object selected by the user, and communicating with the contact object includes: receiving the portrait of the contact object selected by the user; obtaining the contact information bound with the portrait of the contact object selected by the user; and communicating with the contact object selected by the user according to the obtained contact information.

Preferably, before the shortcut panel is invoked, the method further includes: selecting contact objects each with a contact frequency larger than a second preset threshold or a second preset number of contact objects with the top contact frequencies from the contact list in the terminal according to the contact frequencies of the contact objects in the contact list of the terminal, and adding the contact information of the contact objects selected from the contact list to the shortcut list, where the contact frequency of the contact object refers to the frequency of communication between the user and the contact object.

Preferably, after the communication is established with the contact object selected by the user, the method further includes: increasing the contact frequency of the contact object selected by the user according to the type of the communication between the user and the contact object selected by the user.

Preferably, the method also includes: obtaining a contact object which has not been contacted by the user for a preset period from the contact list in the terminal, and reducing the contact frequency of the obtained contact object.

Preferably, the method also includes: if the contact information of a contact object included in the contact list in the terminal is changed, where the contact object is also included in the shortcut panel of the terminal, the changed contact information of the contact object is obtained from the contact list in the terminal and used for updating the contact information of the corresponding contact object in the shortcut panel of the terminal.

Preferably, a contact object adding key is included in the shortcut panel of the terminal.

After the shortcut panel of the terminal is invoked, the method also includes: invoking the contact list of the terminal according to an instruction for adding a contact object that is triggered by the user through the contact object adding key to obtain the contact information of a contact object selected by the user, and adding the contact information of the contact object selected by the user to the shortcut list.

Preferably, a contact object deleting key is included in the shortcut panel of the terminal.

After the shortcut panel is invoked, the method also includes: deleting a contact object selected by the user from the shortcut panel according to an instruction for deleting the contact object that is triggered by the user through the contact object deleting key.

In the quick communication method provided by the embodiment of the present disclosure, a quick communication key is displayed on the lock screen interface at the terminal, and an operation is triggered by the user on the quick communication key to invoke a shortcut panel at the terminal, to enable the user to select a contact object from the shortcut panel and communicate with the selected contact object, without the step of unlocking the keypad of the terminal and opening the contact list or the call history to find the contact information. Accordingly, just one operation of clicking the quick communication key is necessary for selecting the contact object, thus the efficiency of the communication between the terminals is improved.

Second Embodiment

Figure 2:
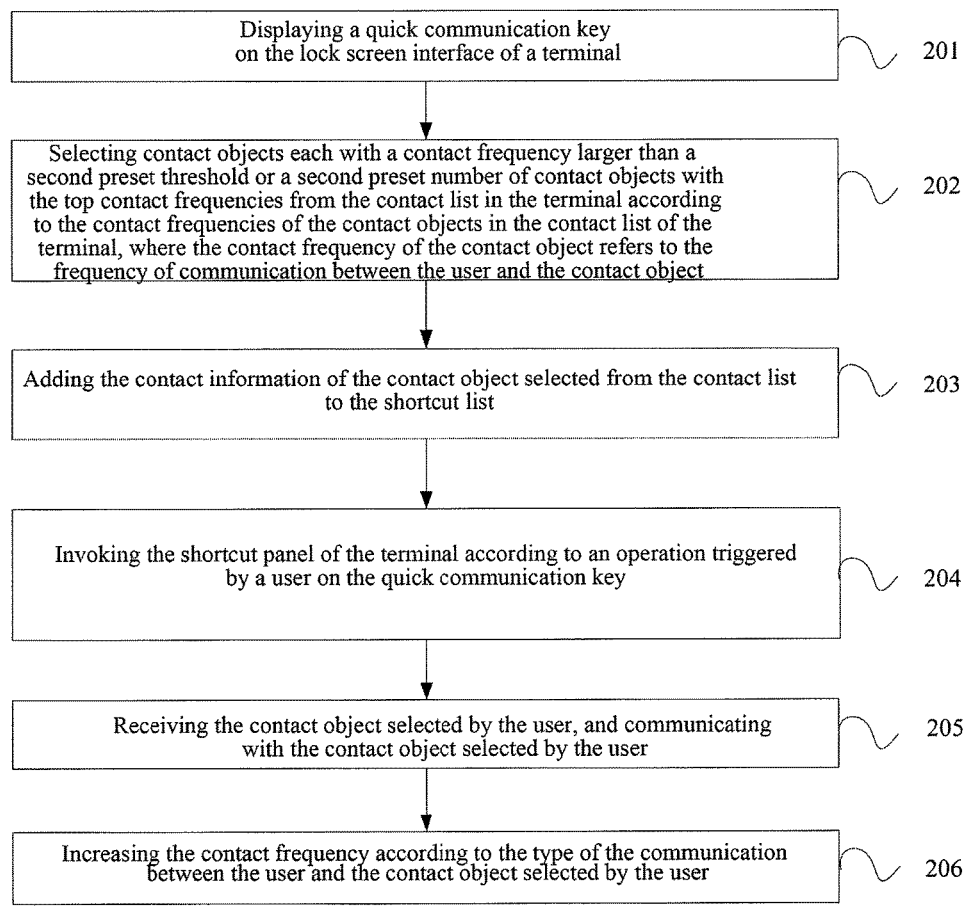
FIG. 2 is a flow chart of the quick communication method according to a second embodiment of the present disclosure.

A quick communication method is provided in the embodiment of the present disclosure. Referring to the FIG. 2, the method includes the following Steps 201-206.

Step 201: displaying a quick communication key on a lock screen interface of a terminal.

The quick communication key is used for quick communication in the lock screen state of the terminal, which is a communicating device with a touch panel, such as a mobile phone with a touch panel.

Showing a quick communication key on the lock screen interface of the terminal includes: setting a quick communication key on the lock screen interface of the terminal and enabling the quick communication key.

Step 202: selecting contact objects each with a contact frequency larger than a second preset threshold or a second preset number of contact objects with the top contact frequencies from the contact list in the terminal according to the contact frequencies of the contact objects in the contact list of the terminal, where the contact frequency of the contact object refers to the frequency of communication between the user and the contact object.

The contact list includes the contact information of all the contact objects of the user; the contact frequency of the contact object refers to the frequency of communication between the user and the contact object. The larger the contact frequency of the contact object is, the larger the frequency of communication between the user and the contact object is; and the smeller the contact frequency of the contact object is, the smaller the frequency of communication between the user and the contact object is.

The contact information includes at least the phone number of the contact object, and the contact information may also include the name and/or the portrait of the contact object.

The step of selecting contact objects each with a contact frequency larger than a second preset threshold or a second preset number of contact objects with the top contact frequencies from the contact list in the terminal according to the contact frequencies of the contact objects in the contact list of the terminal includes: selecting each contact object with a contact frequency larger than a second preset threshold from the contact list in the terminal according to the contact frequency of the contact object in the contact list of the terminal; or sorting the contact objects in the contact list of the terminal according to the contact frequencies of the contact objects (if the contact frequencies of some contact objects in the contact list of the terminal are the same with each other, these contact objects with the same contact frequency are sorted according to the order of initial letters of the last names in the names of the contact objects included in the contact information of the contact objects), and selecting a second preset number of contact objects with the top contact frequencies from the contact list in the terminal.

The step of selecting a second preset number of contact objects with the top contact frequencies from the contact list in the terminal includes: if the contact objects in the contact list of the terminal are sorted in an order of decreasing contact frequencies of the contact objects, the former second preset number of contact objects are selected from the sorted contact objects; and if the contact objects in the contact list of the terminal are sorted in an order of increasing contact frequencies of the contact objects, the latter second preset number of contact objects are selected from the sorted contact objects.

Herein the second preset threshold can be preset as desired and the second preset number is a positive integer. In the present embodiment of the disclosure, for example, the first preset number is three, the contact objects in the contact list of the terminal are sorted in an order of decreasing contact frequencies of the contact objects, so that the former three contact objects are selected from the contact list and added to the shortcut list.

Preferably, when the user communicates with a contact object from the contact list, increasing the contact frequency of the contact object at the terminal according to the type of communication between the user and the contact object includes: obtaining an increment frequency value corresponding to the type of the communication between the user and contact object according to a stored corresponding relation between the communication type and the increment frequency value, and increasing the contact frequency of the contact object according to the obtained the increment frequency value.

If the user calls the contact object, the type of the communication between the user and contact object is calling; and if the user contacts with the contact object with a sort message, the type of the communication between the user and contact object is messaging. The increment frequency value corresponding to the calling and the increment frequency value corresponding to the messaging are defined in the corresponding relations between the communication types and the increment frequency values.

For example, referring to table 1, the corresponding relations between the communication types and the increment frequency values are preset as in table 1, where, the increment frequency value corresponding to the calling is defined as 3, and the increment frequency value corresponding to the messaging is defined as 2.

TABLE 1

| Communication type | Increment Frequency Value |
| --- | --- |
| Calling | 3 |
| Messaging | 2 |

If the type of the communication between the user and the contact object is the calling, the increment frequency value of 3 corresponding to the calling is obtained according to the corresponding relations between the communication types and the increment frequency values illustrated in table 1, and the contact frequency of the contact object is increased by the increment frequency value of 3; and if type of the communication between the user and the contact object is the messaging, the increment frequency value of 2 corresponding to the messaging is obtained according to the corresponding relations between the communication types and the increment frequency values illustrated in table 1, and the contact frequency of the contact object is increased by the increment frequency value of 2.

Preferably, obtaining a contact object which has not been contacted by the user for a preset period from the contact list in the terminal, and reducing the contact frequency of the obtained contact object can be: obtaining a contact object which has not been called by the user for a preset period from the contact list in the terminal, and reducing the contact frequency of the obtained contact object by a first value; and obtaining a contact object which has not been contacted by the user via a short message for a preset period from the contact list in the terminal, and reducing the contact frequency of the obtained contact object by a second value.

The first value, the second value, and the preset period may be set as desired, which is not limited in the present embodiment of the disclosure.

Step 203: adding the contact information of the contact object selected from the contact list to the shortcut list.

The contact list also includes the portrait of the contact object selected from the contact list.

The step of adding the contact information of the contact object selected from the contact list to the shortcut panel at the terminal includes: obtaining the portrait of the selected contact object from the contact list of the terminal; binding the portrait of the selected contact object with the contact information; and loading the bound portrait of the selected contact object to the shortcut panel.

After the quick communication key is displayed on the lock screen interface of the terminal, an operation can be triggered by the user on the quick communication key.

The triggered operation can be a clicking or dragging operation, where, the clicking operation can be triggered by the user through clicking the quick communication key, or the dragging operation can be triggered by the user through dragging the quick communication key.

Step 204: invoking the shortcut panel of the terminal according to an operation triggered by a user on the quick communication key.

The step of invoking the shortcut panel of the terminal can include: loading the shortcut list in the terminal to the shortcut panel, obtaining an identifier and contact information corresponding to the portrait of the contact object from the shortcut panel of the terminal, obtaining the portrait of the contact object corresponding to the identifier from the contact list in the terminal according to the obtained identifier, binding the portrait of the contact object with the contact information of the contact object, and loading the portrait of the contact object to the shortcut panel.

Preferably, before the step of loading the shortcut list in the terminal to the shortcut panel, the shortcut panel is created.

Herein, loading the portrait of the contact object and the name or the phone number of the contact object included in the contact information to the shortcut panel may include: obtaining an identifier and contact information corresponding to the portrait of the contact object from the shortcut panel of the terminal, obtaining the portrait of the contact object corresponding to the identifier from the contact list in the terminal according to the obtained identifier, binding the portrait of the contact object with the contact information of the contact object, and loading the portrait of the contact object and the name or the phone number of the contact object included in the contact information to the shortcut panel at the terminal.

If only the phone number of a contact object is included in the contact information of the contact object, the shortcut panel is invoked by the operation triggered by the user on the quick communication key, the identifier and the phone number corresponding to the portrait of the contact object are obtained from the shortcut list in the terminal; the portrait of the contact object corresponding to obtained identifier is obtained from the contact list of the terminal according to the obtained identifier corresponding to the portrait of the contact object; the portrait of the contact object is bound with the phone number of the contact object, and the portrait of the contact object and the phone number of the contact object are loaded to the shortcut panel; and if the phone number and the name of the contact object are included in the contact information, the shortcut panel is invoked by the operation triggered by the user on the quick communication key; the identifier, the phone number and the name of the contact object corresponding to the portrait of the contact object are obtained from the shortcut list in the terminal; the portrait of the contact object corresponding to the obtained identifier is obtained from the contact list in the terminal according to the identifier corresponding to the portrait of the contact object; the portrait of the contact object, the phone number and the name of the contact object are bound together; and the portrait and the name of the contact object are loaded to the shortcut panel.

For example, the shortcut list in the terminal includes the contact information and identifiers corresponding to the portraits of three contact objects, i.e. Wei LIN, Ting LIU, and Miao MIAO. The identifier corresponding to the portrait of the contact object Wei LIN is ID1 and the name Wei LIN and the phone number are included in the contact information of the contact object Wei LIN; the identifier corresponding to the portrait of the contact object Ting LIU is ID2 and the name Ting LIU and the phone number are included in the contact information of the contact object Ting LIU; and the identifier corresponding to the portrait of the contact object Miao MIAO is ID1 and the name Miao MIAO and the phone number are included in the contact information of the contact object Miao MIAO.

Figure 2A:
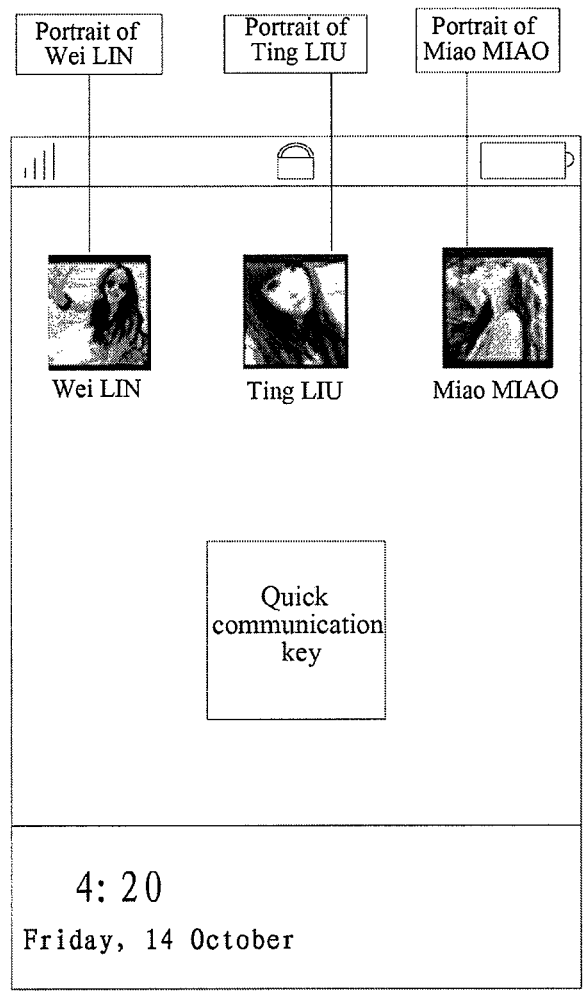
FIG. 2a is a schematic view showing the shortcut panel according to the second embodiment of the present disclosure.

As illustrated in FIG. 2a, according to the operation triggered by the user on the quick communication key displayed on the lock screen interface of the terminal, the portraits of the contact objects Wei LIN, Ting LIU, and Miao MIAO corresponding to the identifiers ID1, ID2 and ID3 are obtained from the contact list of the terminal according to the identifiers ID1, ID2 and ID3 corresponding to the portraits of the contact objects; the portrait of the contact object Wei LIN is bound with the contact information of the contact object Wei LIN, the portrait of the contact object Ting LIU is bound with the contact information of the contact object Ting LIU, and the portrait of the contact object Miao MIAO is bound with the contact information of the contact object Miao MIAO; the portrait and the name Wei LIN of the contact object Wei LIN are loaded to the shortcut panel, the portrait and the name Wei Ting LIU of the contact object Ting LIU are loaded to the shortcut panel, and the portrait and the name Miao MIAO of the contact object Miao MIAO are loaded to the shortcut panel, as illustrated in FIG. 2a.

The portrait of the contact object, and the name or the phone number of the contact object included in the contact information, are shown in the shortcut panel of the terminal, and it is allowed for the user to communicate with the selected contact object through the portrait, the name or the phone number in the shortcut panel of the terminal.

Herein the portrait, the name or the phone number of the contact object to be communicated with can be selected by the user from the shortcut panel of the terminal, then Step 250 is executed.

Step 205: receiving the contact object selected by the user, and communicating with the contact object selected by the user; If the portrait of the contact object is loaded to the shortcut panel, the step of receiving the contact object selected by the user and communicating with the contact object selected by the user includes: receiving the portrait of the contact object selected by the user, obtaining the contact information bound with the portrait of the contact object selected by the user, and communicating with the contact object selected by the user according to the obtained contact information.

If the name of the contact object included in the contact information is loaded to the shortcut panel, the step of receiving the contact object selected by the user and communicating with the contact object selected by the user may include: receiving the name of the contact object selected by the user, obtaining the contact information bound with the name selected by the user according to the name of the contact object selected by the user, and communicating with the contact object selected by the user according to the obtained contact information.

If the phone number of the contact object included in the contact information is loaded to the shortcut panel, the step of receiving the contact object selected by the user and communicating with the contact object selected by the user may include: receiving the phone number of the contact object selected by the user, obtaining the contact information bound with the selected phone number according to the phone number of the contact object selected by the user, and communicating with the contact object selected by the user according to the obtained contact information.

Step 206: increasing the contact frequency according to the type of the communication between the user and the contact object selected by the user.

Particularly, an increment frequency value corresponding to the type of the communication between the user and contact object is obtained according to a stored corresponding relation between the communication type and the increment frequency value, and the contact frequency of the contact object is increased according to the obtained the increment frequency value.

The communication type includes calling and messaging. If the user calls the contact object, the communication type is calling; and if the user contacts with the contact object with a short message, the communication type is messaging.

Preferably, if the contact information of a contact object included in the contact list in the terminal is changed, where the contact object is also included in the shortcut panel of the terminal, the changed contact information of the contact object is obtained from the contact list in the terminal and used for updating the contact information of the corresponding contact object in the shortcut panel of the terminal.

Particularity, if an informing message for informing the change of the contact information of the contact object included in the contact list of the terminal is received in the terminal, where the informing message carries the identifier corresponding to the changed contact object, the terminal determines whether the changed contact object is also contained in the shortcut list according to the informing message, and if the changed contact object is included in the shortcut list, the changed contact information of the contact object is obtained from the contact list in the terminal and used for updating the obtained contact information of the corresponding contact object in the shortcut list at the terminal.

Herein, a function setting key is also included in the shortcut panel of the terminal, and the user is allowed to set whether to enable the function of rounding the portrait and enable the dial animation through the function setting key.

A contact object adding key is also included in the shortcut panel of the terminal, and a contact object can be added to the shortcut panel by the user through the contact object adding key by: invoking the contact list of the terminal according to an instruction for adding a contact object that is triggered by the user through the contact object adding key to obtain the contact information of a contact object selected by the user, and adding the contact information of the contact object selected by the user to the shortcut list.

A contact object deleting key is included in the shortcut panel of the terminal, and a contact object can be deleted from the shortcut panel by the user through the contact object deleting key.

Before the contact object is deleted from the shortcut panel by the user through the contact object deleting key, it is necessary for the device to invoke an edit mode by: pressing on the portrait of the contact object in the shortcut panel by the user for a preset period to trigger a long-pressing event, and when the long-pressing event on the portrait of the contact object in the shortcut panel is triggered in the terminal by the user, the edit mode is invoked.

In the edit mode, the contact object can be deleted from the shortcut panel by the user, and the display order of the contact objects in the shortcut panel can also be adjusted by the user.

A contact object deleting key is also included in the shortcut panel of the terminal, and the step of deleting a contact object from the shortcut panel by the user through the contact object deleting key includes: deleting a contact object selected by the user from the shortcut panel according to an instruction for deleting the contact object that is triggered by the user through the contact object deleting key.

Adjusting the display order of the contact object in the shortcut panel by the user may particularly include: when the terminal detects that the user drags the portrait of the contact object in the edit mode, moving the position of the portrait of the contact object in the shortcut panel according to the track of dragging the portrait of the contact object.

In the quick communication method provided by the embodiment of the present disclosure, a quick communication key is displayed on the lock screen interface at the terminal, and an operation is triggered by the user on the quick communication key to invoke a shortcut panel at the terminal, to enable the user to select a contact object from the shortcut panel and communicate with the selected contact object, without the operation step of unlocking the keypad at the terminal and opening the contact list or the call history to find the contact information. Accordingly, just one operation of clicking the quick communication key is necessary for selecting the contact object, thus the efficiency of the communication between the terminals is improved.

Third Embodiment

Figure 3:
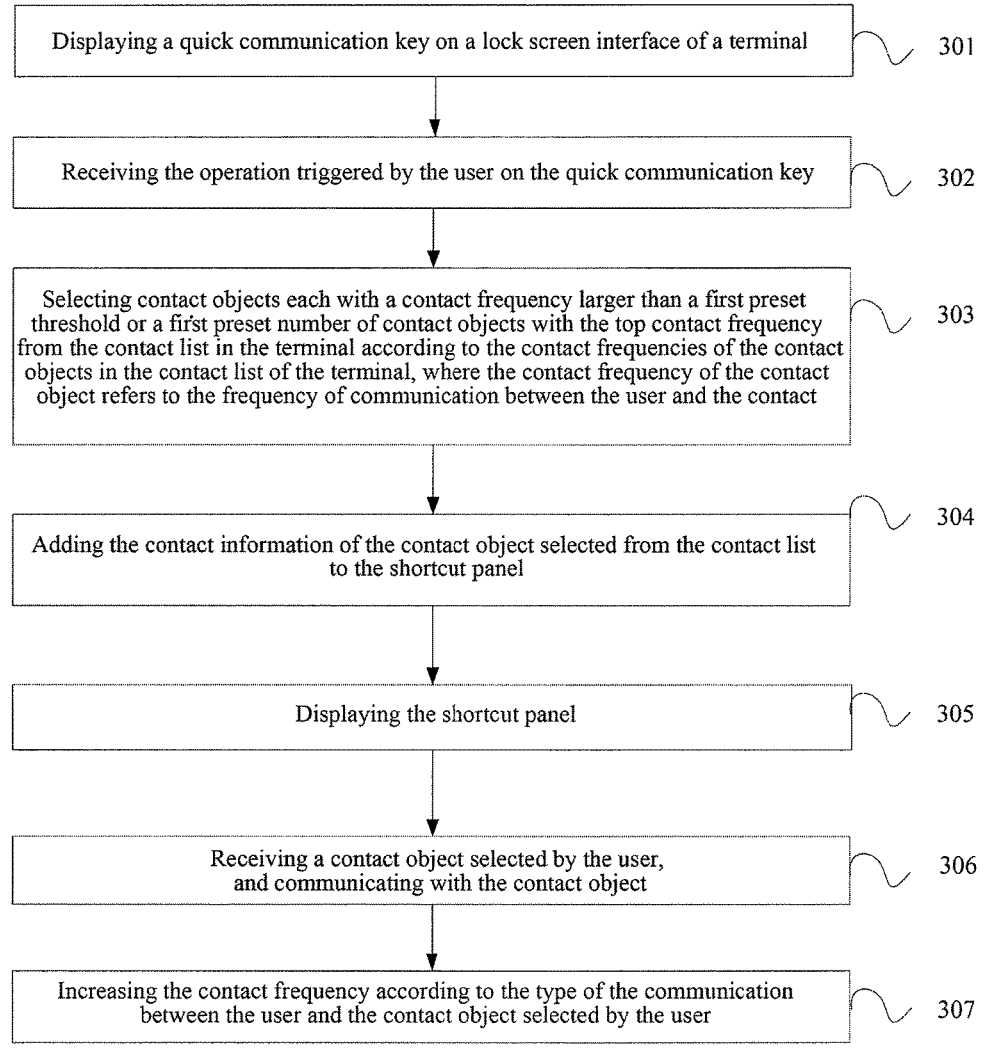
FIG. 3 is a flow chart of the quick communication method according to a third embodiment of the present disclosure.

A quick communication method is provided by the present disclosure. Referring to FIG. 3, the method includes:

Step 301: displaying a quick communication key on a lock screen interface of a terminal.

The quick communication key is used for quick communication in the lock screen state of the terminal, which is a communicating device with a touch panel, such as a mobile phone with a touch panel.

The step of displaying a quick communication key on the lock screen interface of the terminal includes: setting a quick communication key on the lock screen interface of the terminal and enabling the quick communication key.

Step 302: receiving the operation triggered by the user on the quick communication key, and then executing step 303.

The operation triggered by the user on the quick communication key can be: clicking the quick communication key by the user or dragging the quick communication key by the user.

Step 303 is executed after the operation triggered by the user on the quick communication key.

Step 303: selecting contact objects each with a contact frequency larger than a first preset threshold or a first preset number of contact objects with the top contact frequencies from the contact list in the terminal according to the contact frequencies of the contact objects in the contact list of the terminal, where the contact frequency of the contact object refers to the frequency of communication between the user and the contact.

The contact information of all the contact objects are included in the contact list, the contact information of all the contact objects or a part of the contact objects in the contact list of the terminal are included in the shortcut panel; a contact frequency refers to the frequency of the communication between the user and the contact object. The larger the contact frequency of the contact object is, the larger the frequency of the communication between the user and the contact object is, and the smaller the contact frequency of the contact object is, the smaller the frequency of the communication between the user and the contact object is.

At least the phone number of the contact object is included in the contact information, and the contact information also includes the name and/or the portrait of the contact object.

The step of selecting contact objects each with a contact frequency larger than a first preset threshold or a first preset number of contact objects with the top contact frequencies from the contact list in the terminal according to the contact frequencies of the contact objects in the contact list of the terminal may include: selecting each contact object with a contact frequency larger than a first preset threshold from the contact list in the terminal according to the contact frequency of the contact object in the contact list of the terminal; or sorting the contact objects in the contact list of the terminal according to the contact frequencies of the contact objects (if the contact frequencies of some contact objects in the contact list of the terminal are the same with each other, these contact objects with the same contact frequency are sorted according to the order of initial letters of the last names in the names of the contact objects included in the contact information of the contact objects), and selecting a first preset number of contact objects with the top contact frequencies from the contact list in the terminal.

The step of selecting a first preset number of contact objects with the top contact frequencies from the contact list in the terminal includes: if the contact objects in the contact list of the terminal are sorted in an order of decreasing contact frequencies of the contact objects, the former first preset number of contact objects are selected from the sorted contact objects; and if the contact objects in the contact list of the terminal are sorted in an order of increasing contact frequencies of the contact objects, the latter first preset number of contact objects are selected from the sorted contact objects.

Herein the first preset threshold can be preset as desired and the first preset number is a positive integer. In the present embodiment of the disclosure, for example, the first preset number is three, the contact objects in the contact list of the terminal are sorted in an order of decreasing contact frequencies of the contact objects, so that the former three contact objects are selected from the contact list and added to the shortcut list.

Preferably, when the user communicates with a contact object from the contact list, increasing the contact frequency of the contact object at the terminal according to the type of communication between the user and the contact object includes: obtaining an increment frequency value corresponding to the type of the communication between the user and contact object according to a stored corresponding relation between the communication type and the increment frequency value, and increasing the contact frequency of the contact object according to the obtained the increment frequency value.

If the user calls the contact object, the type of the communication between the user and contact object is calling; and if the user contacts with the contact object with a sort message, the type of the communication between the user and contact object is messaging. The increment frequency value corresponding to the calling and the increment frequency value corresponding to the messaging are defined in the corresponding relations between the communication types and the increment frequency values.

If the type of the communication between the user and the contact object is the calling, the increment frequency value of 3 corresponding to the calling is obtained according to the corresponding relations between the communication types and the increment frequency values illustrated in table 1, and the contact frequency of the contact object is increased by the increment frequency value of 3; and if type of the communication between the user and the contact object is the messaging, the increment frequency value of 2 corresponding to the messaging is obtained according to the corresponding relations between the communication types and the increment frequency values illustrated in table 1, and the contact frequency of the contact object is increased by the increment frequency value of 2.

Preferably, obtaining a contact object which has not been contacted by the user for a preset period from the contact list in the terminal, and reducing the contact frequency of the obtained contact object can be: obtaining a contact object which has not been called by the user for a preset period from the contact list in the terminal, and reducing the contact frequency of the obtained contact object by a first value; and obtaining a contact object which has not been contacted by the user via a short message for a preset period from the contact list in the terminal, and reducing the contact frequency of the obtained contact object by a second value.

The first value, the second value, and the preset period may be set as desired, which is not limited in the present embodiment of the disclosure.

Step 304: adding the contact information of the contact object selected from the contact list to the shortcut panel.

The contact list also includes the portrait of the contact object selected from the contact list.

The step of adding the contact information of the contact object selected from the contact list to the shortcut panel can be: obtaining the portrait of the selected contact object from the contact list in the terminal; binding the portrait of the selected contact object with the contact information; loading the bound portrait of the contact object, which has been selected to the shortcut panel.

After the quick communication key is displayed on the lock screen interface of the terminal by the terminal, the operation can be triggered to by the user on the quick communication key.

The triggered operation can be a clicking or dragging operation, where, the clicking operation can be triggered by the user through the clicking the quick communication key, or the dragging operation can be triggered by the user through the dragging the quick communication key.

Step 305: displaying the shortcut panel.

At least the phone number of a contact object is included in the contact information of the contact object, and the contact information also includes the portrait and/or the name of the contact object.

If only the phone number of a contact object is included in the contact information, the operation of loading the contact information of the contact object selected from the contact list to the shortcut panel can be: obtaining the phone number of the contact object included in the contact information from the contact list of the terminal, loading the obtained phone number of the contact object included in the contact information from the contact list in the terminal to the shortcut panel in the terminal.

If the phone number and the portrait of the contact are included in the contact information, the operation of loading the contact information of the selected contact object from the contact list of the terminal to the shortcut panel of the terminal can be: obtaining an identifier corresponding to the portrait of the contact object, and the phone number of the contact object included in the contact information from the contact list in the terminal; obtaining the portrait of the contact object corresponding to identifier from the contact list in the terminal according to the identifiers corresponding to the portrait of the contact object; binding the portrait of the contact object with the phone number of the contact object included in the contact information, and loading the portrait of the contact object and the phone number of the contact object included in the contact information to the shortcut panel.

If the phone number, the name, and the portrait of the contact object are included in the contact information, the operation of loading the contact information of the contact object selected from the contact list in the terminal to the shortcut panel of the terminal can be: obtaining an identifier corresponding to the portrait of the contact object, and the phone number and the name of the contact object included in the contact information from the contact list in the terminal; obtaining the portrait of the contact object corresponding to the identifier from the contact list in the terminal according to the identifiers corresponding to the portrait of the contact object; binding the portrait of the contact object with the phone number and the name of the contact object, and loading the portrait of the contact object, z and the name of the contact object to the shortcut panel at the terminal.

The portrait of the contact object, and the name and the phone number of the contact object included in the contact information, are shown in the shortcut panel in the terminal, and it is allowed for the user to communicate with the selected contact object through the portrait, the phone number and the name of the contact object in the shortcut panel.

Herein the portrait, the phone number or the name of the contact object to be communicated with can be selected by the user from the shortcut panel, then step 306 is executed.

Step 306: receiving a contact object selected by the user, and communicating with the contact object selected by the user.

If the portrait of the contact object is loaded to the shortcut panel, the step of receiving the contact object selected by the user, and communicating with the contact object selected by the user includes: obtaining the contact information bound with the portrait of the contact object selected by the user according to the received portrait of the contact object selected by the user, communicating with the contact object selected by the user according to the obtained contact information.

If the name of the contact object included in the contact information is loaded to the shortcut panel, the step of receiving the portrait of the contact object selected by the user, obtaining the contact information bound with the portrait of the contact object selected by the user, communicating with the contact object selected by the user according to the obtained contact information may include: receiving the name of the contact object selected by the user, obtaining the contact information bound with the selected name according to the name of the contact object selected by the user, and communicating with the contact object selected by the user according to the obtained contact information If the phone number of the contact object included in the contact information is loaded to the shortcut panel, the step of receiving the portrait of the contact object selected by the user, obtaining the contact information bound with the portrait of the contact object selected by the user, communicating with the contact object selected by the user according to the obtained contact information includes: receiving the phone number of the contact object selected by the user, obtaining the contact information bound with the selected name according to the phone number of the contact object selected by the user, and communicating with the contact object selected by the user according to the obtained contact information.

Step 307: increasing the contact frequency according to the type of the communication between the user and the contact object selected by the user.

Particularly, an increment frequency value corresponding to the type of the communication between the user and contact object is obtained according to a stored corresponding relation between the communication type and the increment frequency value, and the contact frequency of the contact object is increased according to the obtained the increment frequency value.

Here, the communication type includes calling and messaging. If the user calls the contact object, the communication type is calling; and if the user contacts with the contact object with a short message, the communication type is messaging.

Preferably, if the contact information of a contact object included in the contact list in the terminal is changed, where the contact object is also included in the shortcut panel of the terminal, the changed contact information of the contact object is obtained from the contact list in the terminal and used for updating the contact information of the corresponding contact object in the shortcut panel of the terminal.

Particularity, if an informing message for informing the change of the contact information of the contact object included in the contact list of the terminal is received in the terminal, where the informing message carries the identifier corresponding to the changed contact object, the terminal determines whether the changed contact object is also contained in the shortcut list according to the informing message, and if the changed contact object is included in the shortcut list, the changed contact information of the contact object is obtained from the contact list in the terminal and used for updating the obtained contact information of the corresponding contact object in the shortcut list in the terminal.

In the quick communication method provided by the embodiment of the present disclosure, a quick communication key is displayed on the lock screen interface at the terminal, and an operation is triggered by the user on the quick communication key to invoke a shortcut panel at the terminal, to enable the user to select a contact object from the shortcut panel and communicate with the selected contact object, without the operation step of unlocking the keypad at the terminal and opening the contact list or the call history to find the contact information. Accordingly, just one operation of clicking the quick communication key is necessary for selecting the contact object, thus the efficiency of the communication between the terminals is improved.

Fourth Embodiment

Figure 4:
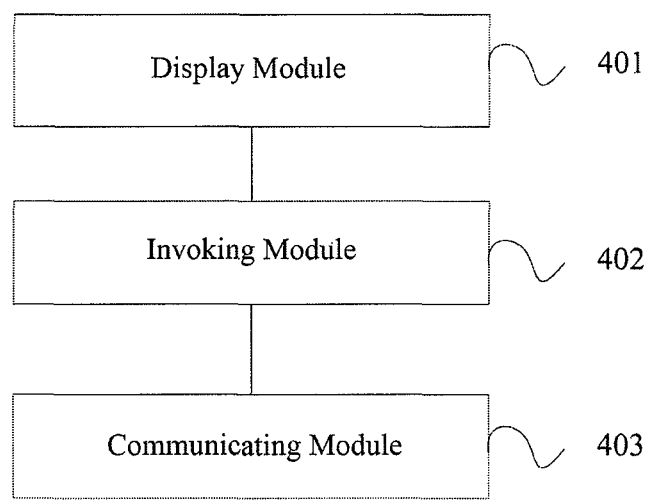
FIG. 4 is a schematic view showing the quick communication device according to a fourth embodiment of the present disclosure.

FIG. 4 shows a schematic view of a quick communication device provided by the embodiment of the present disclosure, and the device includes: a display module 401, which is configured to display a quick communication key on a lock screen interface of a terminal; an invoking module 402, which is configured to invoke a shortcut panel according to an operation triggered by a user on the quick communication key, where the shortcut panel includes contact information of a part or all of contact objects from a contact list in the terminal; and a communicating module 403, which is configured to receive a contact object selected by the user, and communicating with the contact object.

Figure 5:
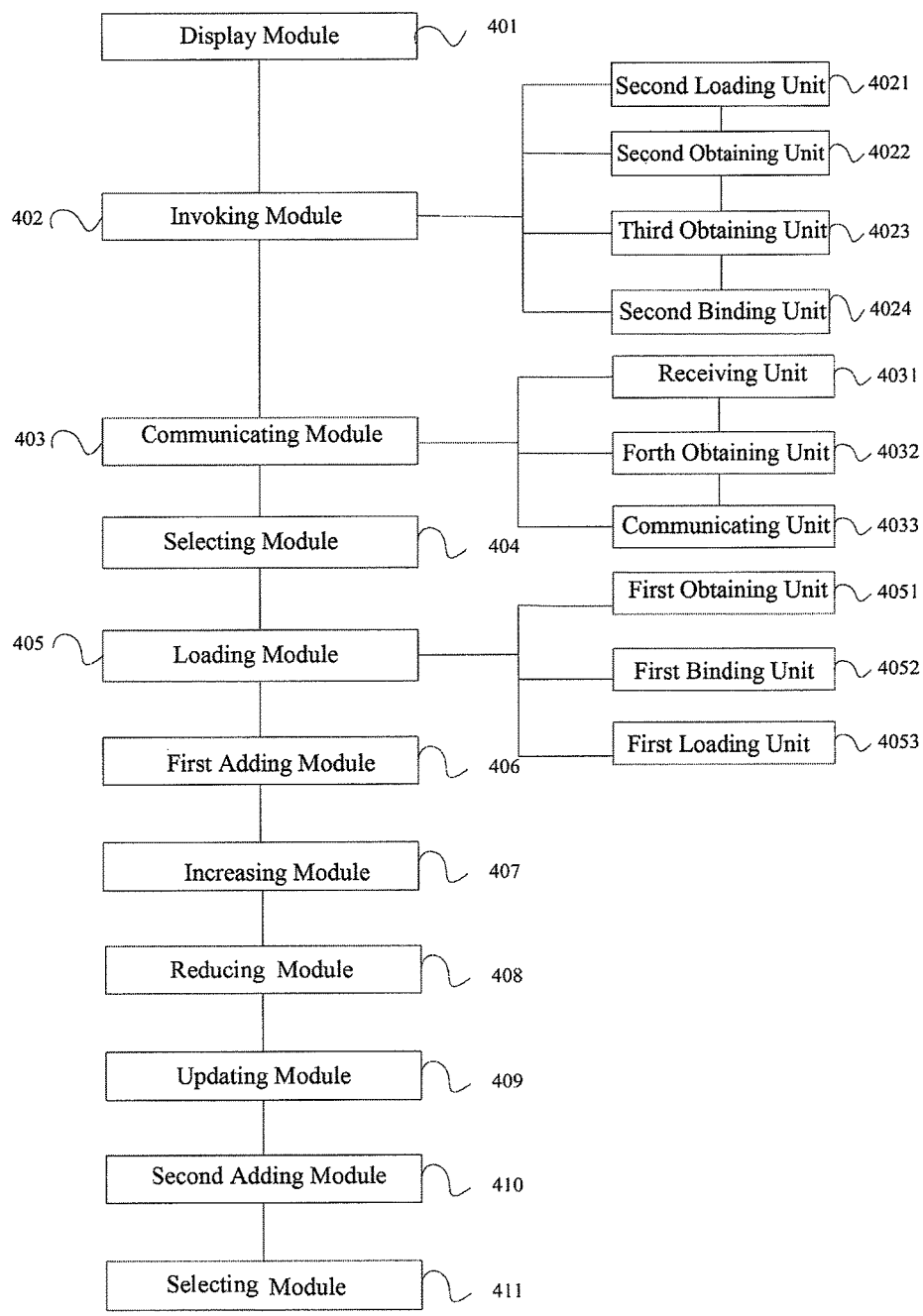
FIG. 5 is a schematic view showing the quick communication device according to the fourth embodiment of the present disclosure.

Preferably, FIG. 5 shows a schematic view of a quick communication device provided by the embodiment of the present disclosure. In addition to the display module 401, the invoking module 402, and the communicating module 403, the device further includes: a selecting module 404, which is configured to select contact objects each with a contact frequency larger than a first preset threshold or a first preset number of contact objects with the top contact frequencies from the contact list in the terminal according to the contact frequencies of the contact objects in the contact list of the terminal, where the contact frequency of the contact object refers to the frequency of communication between the user and the contact; and a loading module 405, which is configured to load the contact information of the contact object selected from the contact list to the shortcut panel in the terminal.

Preferably, the portrait of the contact object is also included in the contact list.

The loading module 405 also includes: a first obtaining unit 4051, which is configured to obtain the portrait of the selected contact object from the contact list in the terminal; a first binding unit 4052, which is configured to bind the portrait of the selected contact object with the contact information of the selected contact object; and a first loading unit 4053, which is configured to load the bound portrait of the contact object selected to the shortcut panel.

Preferably, a shortcut list is also included in the terminal, and the shortcut list is used to store identifiers and contact information corresponding to the portraits of the contact objects, and the contact objects in the shortcut list are composed by a part or all of the contact objects in the contact list.

The invoking module 402 includes: a second loading unit 4021, which is configured to load the shortcut list in the terminal to the shortcut panel; a second obtaining unit 4022, which is configured to obtain an identifier and contact information corresponding to the portrait of the contact object; a third obtaining unit 4023, which is configured to obtain the portrait of the contact object corresponding to the identifier of a contact object from the contact list in the terminal according to the identifier corresponding to the portrait of the contact object; and a second binding unit 4024, which is configured to bind the portrait of the contact object with the contact information of the contact object, and loading the portrait of the contact object to the shortcut panel.

Preferably, the communicating module 403 includes: a receiving unit 4031, which is configured to receive the portrait of the contact object selected by the user; a fourth obtaining unit 4032, which is configured to obtain the contact information bound with the portrait of the contact object selected by the user; and a communicating unit 4033, which is configured to communicate with the contact object selected by the user according to the obtained contact information.

Preferably, the device also includes: a first adding module 406, which is configured to select a contact object with a contact frequency larger than a second preset threshold or a second preset number of contact objects with the top contact frequencies from the contact list in the terminal according to the contact frequencies of the contact objects in the contact list of the terminal, and add the contact information of the contact object selected from the contact list to the shortcut list, where the contact frequency of the contact object refers to the frequency of communication between the user and the contact object.

Preferably, the device also includes: an increasing module 407, which is configured to increase the contact frequency of the contact object selected by the user according to the type of the communication between the user and the contact object selected by the user.

Preferably, the device further includes: a reducing module 408, which is configured to obtain a contact object which has not been contacted by the user for a preset period from the contact list in the terminal, and reduce the contact frequency of the obtained contact object.

Preferably, the device also includes: an updating module 409, which is configured to, if the contact information of a contact object included in the contact list in the terminal is changed, where the contact object is also included in the shortcut panel of the terminal, obtain the changed contact information of the contact object from the contact list in the terminal and update the contact information of the corresponding contact object in the shortcut panel of the terminal as the changed contact information of the contact object.

Preferably, a contact object adding key is included in the shortcut panel of the terminal.

The device accordingly also includes: a second adding module 410, which configured to invoke the contact list of the terminal according to an instruction for adding a contact object that is triggered by the user through the contact object adding key to obtain the contact information of a contact object selected by the user, and add the contact information of the contact object selected by the user to the shortcut list.

Preferably, a contact object deleting key is included in the shortcut panel of the terminal.

The device accordingly also includes: a deleting module 411, which is configured to delete a contact object selected by the user from the shortcut panel according to an instruction for deleting the contact object that is triggered by the user through the contact object deleting key.

In the quick communication method provided by the embodiment of the present disclosure, a quick communication key is displayed on the lock screen interface at the terminal, and an operation is triggered by the user on the quick communication key to invoke a shortcut panel at the terminal, to enable the user to select a contact object from the shortcut panel and communicate with the selected contact object, without the operation step of unlocking the keypad at the terminal and opening the contact list or the call history to find the contact information. Accordingly, just one operation of clicking the quick communication key is necessary for selecting the contact object, thus the efficiency of the communication between the terminals is improved.

It should be noted that when the quick communication device provided by the above embodiment is in a communication, the division of several above functional module is just an example, in practice, every function can be achieved by different module according to the need, that is, the inner construction of the device has been divided into several functional modules to complete the a part or all of the above described functions. Additionally, the quick communication device provided by the above embodiment and the quick communication method provided by the above embodiments belongs to a same concept, the quick communication device can be achieved by referring to the embodiments of the quick communication method, which won't be repeat herein.

It should be understood by the skilled person in the art in light of the description of the above embodiments that, the present disclosure can be embodied by software and the necessary universal hardware, or merely hardware, but mostly the former is a preferable embodiment. Based on this understanding, the technical solution of the present disclosure may be substantially embodied in a software product or a part of the technical solution that contributes to the prior art may be embodied in a software product, and the computer software can be stored in the storage medium which may be a floppy disk, a Read-only Memory, a Random Access Memory, a Flash, a hard disk, an optical disk and the like, instructions included in the software product are used to enable the computer device (such as a personal computer, a server or a network device) to execute the method described in the embodiments of the present disclosure.

A storage medium containing computer-executable instructions adapted to perform a quick communication method, and the method comprises steps of: displaying a quick communication key on a lock screen interface of a terminal; invoking a shortcut panel according to an operation triggered by a user on the quick communication key, where the shortcut panel includes contact information of a part or all of the contact objects from the contact list in the terminal; and receiving a contact object selected by the user, and communicating with the contact object.

Preferable embodiments of the present disclosure have been described as above, but are not intended to limit the present invention. Various changes and modifications to the present invention are possible to those skilled in the art. Any modification, equivalent alteration and improvement made in the principle of the present invention is included to the protection scope of the present invention.

What is claimed is:

1. A quick communication method, comprising:
    displaying a quick communication key on a lock screen interface of a terminal;
    invoking a shortcut panel according to an operation triggered by a user on the quick communication key, wherein the shortcut panel includes contact information of a part or all of contact objects from a contact list in the terminal, and the contact objects included in the shortcut panel are selected from the contact list of the terminal according to contact frequencies of contact objects in the contact list;
    receiving a contact object selected by the user;
    communicating with the contact object, a type of a communication between the user and the contact object being one of a calling type and a messaging type; and
    after communicating with the contact object selected by the user, according to a pre-stored correspondence relationship between the type of the communication and an increment frequency value, increasing the contact frequency of the contact object selected by the user by the increment frequency value corresponding to the type of the communication;
    wherein,
    a shortcut list is further included in the terminal, and the shortcut list stores, separately from the contact list, identifiers and contact information of the contact objects included in the shortcut panel, the contact information comprising at least one of a phone number or a contact name;
    invoking a shortcut panel comprises:
        loading the shortcut list in the terminal to the shortcut panel;
        obtaining an identifier and contact information corresponding to a portrait of the contact object from the shortcut list of the terminal;
        obtaining the portrait of the contact object corresponding to the identifier from the contact list in the terminal according to the identifier corresponding to the portrait of the contact object; and
        binding the portrait of the contact object with the contact information of the contact object, and loading the portrait of the contact object to the shortcut panel; and
    the shortcut panel displaying portraits of the contact objects is invoked by a single triggering action from the lock screen interface,
    wherein the method further comprises:
    receiving a message informing a change to contact information of a contact object in the contact list, wherein the message carries an identifier corresponding to the changed contact object;
    determining whether the changed contact object is included in the shortcut list according to the identifier carried in the message; and
    in response to determining that the changed contact object is included in the shortcut list, updating contact information of the changed contact object in the shortcut list using the contact information of the changed contact object in the contact list.

2. The quick communication method according to claim 1, wherein, invoking a shortcut panel comprises:
    in response to the operation triggered by the user on the quick communication key, automatically selecting contact objects each with a contact frequency larger than a first preset threshold or a first preset number of contact objects with the top contact frequencies from the contact list in the terminal according to the contact frequencies of the contact objects in the contact list of the terminal, wherein the contact frequency of the contact object refers to the frequency of communication between the user and the contact; and
    loading the contact information of the contact object selected from the contact list to the shortcut panel in the terminal.

3. The quick communication method according to claim 2, wherein, the contact list further includes portraits of the selected contact objects;
    loading the contact information of the contact object selected from the contact list to the shortcut panel in the terminal comprises:
        obtaining the portrait of the selected contact object from the contact list in the terminal;
        binding the portrait of the selected contact object with the contact information of the selected contact object; and
        loading the bound portrait of the contact object selected from the contact list to the shortcut panel.

4. The quick communication method according to claim 3, wherein, receiving a contact object selected by the user, and communicating with the contact object comprises:
    receiving the portrait of the contact object selected by the user;
    obtaining the contact information bound with the portrait of the contact object selected by the user; and
    communicating with the contact object selected by the user according to the obtained contact information.

5. The quick communication method according to claim 1, wherein, before the shortcut panel is invoked, the method comprises:
    selecting contact objects each with a contact frequency larger than a second preset threshold or a second preset number of contact objects with the top contact frequencies from the contact list in the terminal according to the contact frequencies of the contact objects in the contact list of the terminal, and adding the contact information of the contact objects selected from the contact list to the shortcut list, wherein the contact frequency of the contact object refers to the frequency of communication between the user and the contact object.

6. The quick communication method according to claim 1, wherein, the method comprises:
    obtaining a contact object which has not been contacted by the user for a preset period from the contact list in the terminal, and reducing the contact frequency of the obtained contact object.

7. The quick communication method according to claim 1, wherein, a contact object adding key and a contact object deleting key are included in the shortcut panel of the terminal;
    after the shortcut panel of the terminal is invoked, the method further comprises:

invoking the contact list of the terminal according to an instruction for adding a contact object that is triggered by the user through the contact object adding key to obtain the contact information of a contact object selected by the user, and adding the contact information of the contact object selected by the user to the shortcut list; or after the shortcut panel is invoked, the method further comprises: deleting a contact object selected by the user from the shortcut panel according to an instruction for deleting the contact object that is triggered by the user through the contact object deleting key.

8. The quick communication method according to claim 1, wherein:

the increment frequency value corresponding to the calling type is greater than the increment frequency value corresponding to the messaging type.

9. The quick communication method according to claim 8, wherein: if the contact frequencies of multiple contact objects in the contact list of the terminal are the same, the multiple contact objects are sorted according to an order of initial letters of last names of the contact objects included in the contact information of the contact objects.

10. The quick communication method according to claim 1, further comprising:

invoking an edit mode for editing the contact objects in the shortcut panel in response to a user input on the portrait of the contact object in the shortcut panel.

11. The quick communication method according to claim 10, further comprising:

after the edit mode is invoked, deleting a contact object from the shortcut panel; or after the edit mode is invoked, adjusting a display order of the contact objects by moving positions of portraits of contact objects in the shortcut panel according to a track of user dragging the portrait of the contact object.

12. The quick communication method according to claim 1, further comprising:

providing, on the shortcut panel, a function setting key, wherein the function setting key is configured to set whether to enable a function of rounding the portrait and enable a dial animation.

13. A quick communication device, comprising:

a display module configured to display a quick communication key on a lock screen interface of a terminal;

an invoking module configured to invoke a shortcut panel according to an operation triggered by a user on the quick communication key, wherein the shortcut panel includes contact information of a part or all of contact objects from a contact list in the terminal, and the contact objects included in the shortcut panel are selected from the contact list of the terminal according to contact frequencies of contact objects in the contact list;

a communicating module configured to receive a contact object selected by the user, and communicate with the contact object, a type of a communication between the user and the contact object being one of a calling type and a messaging type; and an increasing module configured to, after communicating with the contact object selected by the user, according to a pre-stored correspondence relationship between the type of the communication and an increment frequency value, increase the contact frequency of the contact object selected by the user by the increment frequency value corresponding to the type of the communication;

wherein a shortcut list is further included in the terminal, and the shortcut list stores, separately from the contact list, identifiers and contact information of the contact objects included in the shortcut panel, the contact information comprising at least one of a phone number or a contact name;

the invoking module is further configured to:
load the shortcut list in the terminal to the shortcut panel;
obtain an identifier and contact information corresponding to the portrait of the contact object;
obtain the portrait of the contact object corresponding to identifier from the contact list in the terminal according to the identifier corresponding to the portrait of the contact object; and
bind the portrait of the contact object with the contact information, and loading the portrait of the contact object to the shortcut panel; and the shortcut panel displaying portraits of the contact objects is invoked by a single triggering action from the lock screen interface, wherein the method further comprises an updating module configured to:
receive a message informing a change to contact information of a contact object in the contact list, wherein the message carries an identifier corresponding to the changed contact object;
determine whether the changed contact object is included in the shortcut list according to the identifier carried in the message; and
in response to determining that the changed contact object is included in the shortcut list, update contact information of the changed contact object in the shortcut list using the contact information of the changed contact object in the contact list.

14. The quick communication device according to claim 13, wherein the device comprises:

a selecting module, which is configured to, in response to the operation triggered by the user on the quick communication key, automatically select contact objects each with a contact frequency larger than a first preset threshold or a first preset number of contact objects with the top contact frequencies from the contact list in the terminal according to the contact frequencies of the contact objects in the contact list of the terminal, wherein the contact frequency of the contact object refers to the frequency of communication between the user and the contact;

a loading module, which is configured to load the contact information of the contact object selected from the contact list to the shortcut panel in the terminal.

15. The quick communication device according to claim 14, wherein a portrait of the contact object is further included in the contact list;

the loading module further comprises:
a first obtaining unit, which is configured to obtain the portrait of the selected contact object from the contact list in the terminal;
a first binding unit, which is configured to bind the portrait of the selected contact object with the contact information of the selected contact object; and
a first loading unit, which is configured to load the bound portrait of the contact object selected from the contact list to the shortcut panel.

16. The quick communication device according to claim 15, wherein, the communicating module comprises:

a receiving unit, which is configured to receive the portrait of the contact object selected by the user;

a forth obtaining unit, which is configured to obtain the contact information bound with the portrait of the contact object selected by the user; and a communicating unit, which is configured to communicate with the contact object selected by the user according to the obtained contact information.

17. The quick communication device according to claim 13, further comprising:

a first adding module, which is configured to select a contact object with a contact frequencies larger than a second preset threshold or a second preset number of contact objects with the top contact frequencies from the contact list in the terminal according to the contact frequencies of the contact objects in the contact list of the terminal, and add the contact information of the contact object selected from the contact list to the shortcut list, wherein the contact frequency of the contact object refers to the frequency of communication between the user and the contact object.

18. The quick communication device according to claim 13, further comprising:

a reducing module, which is configured to obtain a contact object which has not been contacted by the user for a preset period from the contact list in the terminal, and reduce the contact frequency of the obtained contact object.

19. The quick communication device according to claim 13, wherein a contact object adding key and a contact object deleting key are included in the shortcut panel of the terminal;

the device further comprises:

a second adding module configured to invoke the contact list of the terminal according to an instruction for adding a contact object that is triggered by the user through the contact object adding key to obtain the contact information of a contact object selected by the user, and add the contact information of the contact object selected by the user to the shortcut list; and a deleting module configured to delete a contact object selected by the user from the shortcut panel according to an instruction for deleting the contact object that is triggered by the user through the contact object deleting key.

20. A non-transitory storage medium comprising computer-executable instructions, where the computer-executable instructions are configured to perform a quick communication method, and the method comprises:

displaying a quick communication key on a lock screen interface of a terminal;

invoking a shortcut panel according to an operation triggered by a user on the quick communication key, wherein the shortcut panel includes contact information of a part or all of contact objects from a contact list in the terminal, and the contact objects included in the shortcut panel are selected from the contact list of the terminal according to contact frequencies of contact objects in the contact list;

receiving a contact object selected by the user;

communicating with the contact object, a type of a communication between the user and the contact object being one of a calling type and a messaging type; and after communicating with the contact object selected by the user, according to a pre-stored relationship between the type of the communication and an increment frequency value, increasing the contact frequency of the contact object selected by the user by the increment frequency value corresponding to the type of the communication;

wherein, a shortcut list is further included in the terminal, and the shortcut list stores separately from the contact list, identifiers and contact information of the contact objects included in the shortcut panel, the contact information comprising at least one of a phone number or a contact name;

invoking a shortcut panel comprises:

loading the shortcut list in the terminal to the shortcut panel;

obtaining an identifier and contact information corresponding to a portrait of the contact object from the shortcut panel of the terminal;

obtaining the portrait of the contact object corresponding to the identifier from the contact list in the terminal according to the identifier corresponding to the portrait of the contact object; and binding the portrait of the contact object with the contact information of the contact object, and loading the portrait of the contact object to the shortcut panel; and the shortcut panel displaying portraits of the contact objects is invoked by a single triggering action from the lock screen interface, wherein the method further comprises:

receiving a message informing a change to contact information of a contact object in the contact list, wherein the message carries an identifier corresponding to the changed contact object;

determining whether the changed contact object is included in the shortcut list according to the identifier carried in the message; and in response to determining that the changed contact object is included in the shortcut list, updating contact information of the changed contact object in the shortcut list using the contact information of the changed contact object in the contact list.

* * * * *